(12) United States Patent
Drozd et al.

(10) Patent No.: US 6,926,769 B2
(45) Date of Patent: Aug. 9, 2005

(54) CEMENTITOUS COMPOSITIONS AND A METHOD OF THEIR USE

(75) Inventors: Jaroslaw K. Drozd, Bytom (PL); Roderick M. Smart, Alberton (ZA)

(73) Assignee: Fosroc Mining International Limited, Wiltshire (GB)

(*) Notice: Subject to any disclaimer, the term of this patent is extended or adjusted under 35 U.S.C. 154(b) by 0 days.

(21) Appl. No.: 10/474,350

(22) PCT Filed: Apr. 10, 2002

(86) PCT No.: PCT/GB02/01685
§ 371 (c)(1),
(2), (4) Date: Oct. 8, 2003

(87) PCT Pub. No.: WO02/083593
PCT Pub. Date: Oct. 24, 2002

(65) Prior Publication Data
US 2004/0107874 A1 Jun. 10, 2004

(30) Foreign Application Priority Data
Apr. 12, 2001 (GB) .............................. 0109173

(51) Int. Cl.$^7$ .............................. C07B 28/06
(52) U.S. Cl. .............. 106/696; 106/695; 427/421; 427/427
(58) Field of Search ................ 106/695, 696; 427/421, 427

(56) References Cited

U.S. PATENT DOCUMENTS

| | | | |
|---|---|---|---|
| 5,269,845 A | 12/1993 | Grunau et al. | 106/692 |
| 6,780,237 B2 * | 8/2004 | Mills et al. | 106/724 |
| 2002/0157576 A1 * | 10/2002 | Mills et al. | 106/724 |
| 2002/0161071 A1 * | 10/2002 | Mills et al. | 524/2 |

FOREIGN PATENT DOCUMENTS

| | | | |
|---|---|---|---|
| GB | 1 346 779 | | 2/1974 |
| JP | 60-158269 A | * | 8/1985 |
| JP | 61-40862 A | * | 2/1986 |
| JP | 02-59460 A | * | 2/1990 |
| JP | 02-137755 A | * | 5/1990 |
| JP | 2002-316849 A | * | 10/2002 |
| WO | WO 01/28955 | | 4/2001 |
| WO | WO 01/28955 A1 | * | 4/2001 |

* cited by examiner

*Primary Examiner*—Anthony J. Green
(74) *Attorney, Agent, or Firm*—Nixon & Vanderhye, PC

(57) ABSTRACT

A settable composition comprising (i) a cementitious component comprising at least 25% of calcium aluminate of which at least 40% is calcium monoaluminate said cementitious component optionally containing one or more particulate fillers but containing less than 10% by weight of calcium sulphate, the % being by weight being based on the weight of the cementitious component and (ii) an aqueous emulsion of an organic polymer, the amount of (ii) in relation to (i) being such as to provide a weight ratio of polymer solids to weight of (i) of from 0.5:1 to 10:1, preferably 0.6:1 to 2.5:1 or (iii) a dispersible organic polymer and where the amount of dispersible polymer is such as to give a weight ratio of polymer to weight of (i) of from 0.5:1 to 10:1, preferably 0.6:1 to 2.5:1. The cementitious component (i) preferably contains an amount of fiber effective to improve the tensile strength of coatings obtained from the settable composition but not exceeding 5% by weight of the cementitious component (i). The dry composition comprising parts (i) and (iii) above can be mixed with water in the mine.

17 Claims, 1 Drawing Sheet

CEMENTITOUS COMPOSITIONS AND A METHOD OF THEIR USE

Figure 1:
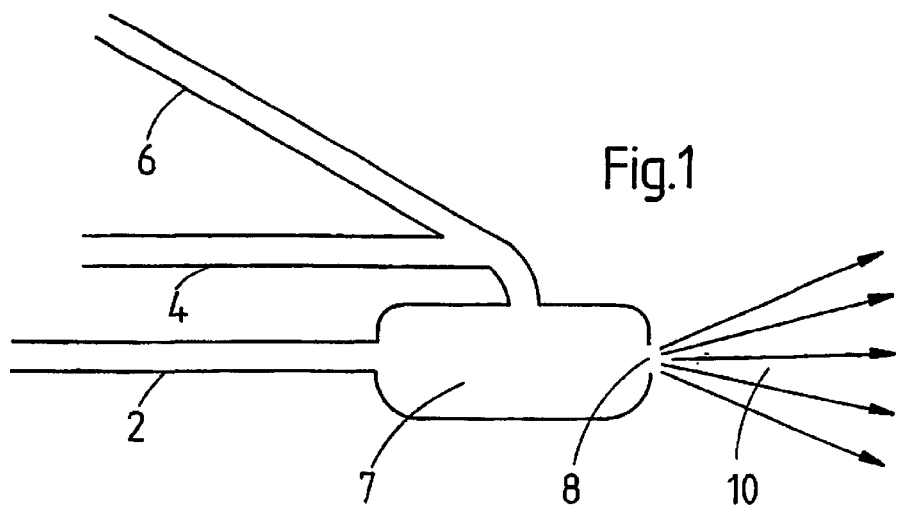

This application is the U.S. national phase of international application PCT/GB02/01685 filed 10 Apr. 2002 which designated the U.S.

FIELD OF THE INVENTION

This invention relates to materials suitable for use in coating surfaces, in particular the surfaces of rock, to a method for their preparation and to a method for the treatment of surfaces employing the materials of the invention.

BACKGROUND OF THE INVENTION

It has been previously proposed to apply a coating to a rock surface in a mine in order to provide support or a gas barrier by spraying an aqueous emulsion of an organic polymer and causing the emulsion to coagulate to produce a flexible coating in the form of a film or skin on the surface.

Polymers which have been disclosed for this purpose include polyurethanes and polychloroprene. The latter has been described in South African Patent No 8203384.

More recently there has been described in WO 98/58886 a composition comprising two parts. One is an aqueous emulsion of an organic polymer such as the copolymer of ethylene and vinyl acetate. The other part is a cementitious composition capable of absorbing at least its own weight of water. The cementitious composition described is an ettringite-forming composition. A well known method of forming ettringite is from calcium sulphate, a source of lime and high alumina cement. In WO 98/58886 high alumina cement is used and the lime is provided by ordinary Portland cement and the calcium sulphate by anhydrite.

In use the two parts are sprayed onto a rock surface of a mine to form a coating. This patent also discloses a dry mixture of solids formed from the cementitious composition and a dried polymer emulsion to which mixture water is subsequently added.

Japanese Patent Application No 05 170496A describes a waterproof resilient floor paving material comprising high alumina cement and per 100 parts by weight of the cement, 5 to 50 parts of fibre, 30 to 300 parts of polymer and 50 to 300 parts of aggregate. The polymer is added to the cement as an aqueous dispersion. The patent reports that when less than 50 parts of aggregate or less than 5 parts of fibre are used sufficient strength is not developed.

Problem to be Solved by the Invention

Coatings, particularly those applied to the walls of a mine need to be flexible and have an adequate tensile strength. Coatings which have been prepared from compositions described in the above mentioned WO98/58886 have shown a gradual loss of flexibility over time. Products which initially are flexible exhibit a tendency to embrittlement after the passage of a few months. This loss of long term flexibility is an undesirable characteristic, especially for coatings which have been applied to the walls of a mine and there is a need to increase the long term flexibility of such coatings.

The present invention provides a solution to this problem by providing a novel composition based on calcium aluminate. Contrary to expectation, it has been found that the long term flexibility of coatings derived from the compositions is increased by reducing the amounts of calcium sulphate and lime from those described in WO 98/58886, or in the case of calcium sulphate, omitting it entirely from the compositions A further problem is that there is a need to increase the early tensile strength eg the strength developed at 2 or 4 hours of coatings used in mines. Another aspect of the invention provides a solution. It has been found that the tensile strength at 2 and 4 hours, is significantly increased by the incorporation into the coating material of minor amounts, typically less than 5% by weight of reinforcing fibres.

SUMMARY OF THE INVENTION

According to the present invention there is provided a settable composition comprising (i) a cementitious component comprising at least 25%, preferably 30 to 99%, of calcium aluminate of which at least 40% is calcium monoaluminate said cementitious component optionally containing one or more particulate fillers but containing less than 10% by weight of calcium sulphate, the % being by weight based on the weight of the cementitious component and (ii) an aqueous emulsion of an organic polymer, the amount of (ii) in relation to (i) being such as to provide a weight ratio of polymer solids to weight of (i) of from 0.5:1 to 10:1, preferably 0.6:1 to 2.5:1 or (iii) a dispersible organic polymer and where the amount of dispersible polymer is such as to give a weight ratio of polymer to weight of (i) of from 0.5:1 to 10:1, preferably 0.6:1 to 2.5:1.

Advantageous Effect of the Invention

The advantage of employing the calcium aluminate-containing compositions which are low in calcium sulphate is that they provide coatings of increased long term flexibility and the advantage of the compositions which are low in calcium sulphate but contain reinforcing fibre is that they provide coatings having not only increased long term flexibility and but also increased early tensile strength.

DETAILED DESCRIPTION OF THE INVENTION

Figure 2:
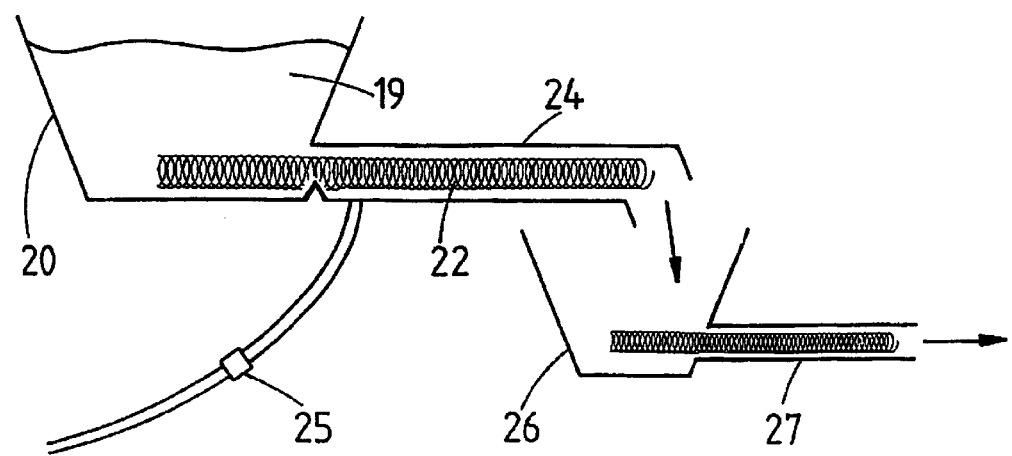

FIGS. 1 and 2 show the apparatus used in mixing and spraying to apply the coatings of the invention.

The term calcium aluminate is intended to include not only the form of calcium aluminate which is often written in cement notation as CA but also other aluminate-containing cements which are written as $CA_2$, $C_3A$, $C_{12}A_7$, $C_4AF$ and $C_{11}A_7CaF_2$ and in addition calcium sulphoaluminate and calcium ferroaluminate.

The term settable includes compositions which do not contain water but which will set by the addition of water. The dry composition comprising parts (i) and (iii) above can be mixed with water in the mine.

Preferably the cementitious component (i) contains an amount of fibre effective to improve the tensile strength of coatings obtained from the settable composition but not exceeding 5% by weight of the cementitious component (i).

The Cementitious Component.

The cementitious component preferably contains from 30 to 99% by weight of calcium aluminate.

The balance of the cementitious component may comprise filler, for example ground granulated blast furnace slag or limestone, preferably in finely divided particulate form, preferably of particle size similar to that of commercial Portland cement.

The filler, if present, is preferably in an amount of less than 100% by weight of the calcium monoaluminate or (in the case when the calcium aluminate is provided by high alumina cement) less than 50% by weight of the high alumina cement.

Thixotropes and set control agents may be included in the cementitious composition if desired.

The cementitious component conveniently contains less than 5% by weight of calcium sulphate, preferably less than 1% of calcium sulphate and more preferably is substantially free of calcium sulphate.

The calcium sulphate, if present, may be provided by a calcium sulphate-containing material such as beta-anhydrite, gypsum, or plaster of Paris.

In a preferred embodiment of the invention the cementitious component apart from the reinforcing fibre, if present, and minor additives such as retarder, accelerator and suspension agents such as gums may consist essentially of a commercial grade of high alumina cement.

The Calcium Aluminate.

Preferably at least 60%, more preferably at least 75% most preferably at least 80% of the calcium aluminate is provided by calcium monoaluminate (CA).

The calcium aluminate may be provided by high alumina cement, sometimes referred to as Ciment Fondu which normally contains about 50 to 80% by weight of calcium aluminate phases (or 30 to 65% of calcium monoaluminate (CA)).

Commercial high alumina cements typically contain as much as 60% of materials other than calcium monoaluminate. These other materials typically include 5 to 10% of gehlenite $C_2AS$, about 2% of $C_{12}A_7$, about 1% of $C_2S$, about 3 to 5% of glassy materials and the remainder being mixed calcium aluminoferrites.

These other materials although they hydrate, react relatively slowly compared to calcium monoaluminate and do not contribute significantly to the early strength.

The High Alumina Cement.

By high alumina cement we mean to include any cement which falls within the definition of a high alumina cement according to British Standard 915 Part 2 i.e. a cement which contains not less than 32% by weight of alumina and has an alumina to calcium oxide ratio of between 0.85 and 1.3:1. Suitable cements are Lafarge Fondu cement described in GB Patent No 1,505,417 and a typical analysis of such a cement is by weight:

38.5% calcium oxide,
39.0% alumina,
16.5% ferric oxide and
4.0% silica. This cement will typically contain about 40% by weight of calcium monoaluminate (CA).

A particularly suitable high alumina cement is one sold by Lafarge under the name Secar 71 having the following analysis:

<31% calcium oxide
>68.5% alumina
<0.3% ferric oxide
<0.3% silica. This cement contains about 65% by weight of calcium monoaluminate (CA).

The term mine in the present specification is intended to include open cast mines, quarries and all underground workings including tunnels.

The invention has application in the construction industry for the treatment of buildings including internal and exterior walls, floors and ceilings.

When used for support in a mine, for example as a substitute for steel mesh, the product is a flexible coating on the rock surface. By flexible is meant the ability of the coating to deform and allow pieces of rock to move and for the coating to retain the ability to take load.

The Polymer Emulsion.

The aqueous emulsion of organic polymer which is sometimes referred to in the art as a polymer latex emulsion may contain as the polymer one or more of a wide range of homopolymers or copolymers of ethylenically unsaturated monomers or naturally occurring polymers. Examples include styrene, styrene butadiene copolymers, divinyl styrene, methyl methacrylate, copolymers of styrene and methyl methacrylate or maleic anhydride, acrylic and acrylic ester resins, vinyl acetate and copolymers thereof with ethylene and other olefins (eg ethylene vinyl avetate), plasticised vinyl chloride copolymers. Suitable polymers are disclosed in U.S. Pat. No. 4,849,018 which are hereby incorporated by reference. Mixture of polymers or copolymers may be used.

It is preferred to employ a polymer with a glass transition temperature, written as $T_g$, of from −50° C. to 50° C. more preferably from −10° C. to 10° C.

Plasticisers such as Cereclor (a chlorinated paraffin), dibutyl phthalate and diethyleneglycol can be added to improve flexibility.

Suitable polymer solids contents of the emulsion are from 5 to 80%, preferably at least 25% e.g. from 30 to 70%, more preferably 45 to 65% by weight based on the weight of the emulsion.

When a dispersible form of the organic polymer is used, the dispersible polymer has conveniently been obtained by drying e.g. spray drying an aqueous polymer emulsion. The dried polymers are available commercially.

The Fibres.

The fibres are conveniently about 1 to 30 mm in length and conveniently have a diameter of about 10 to 40 microns. A length in excess of about 30 mm is not preferred because there is a risk of the nozzle being blocked when the composition is sprayed. The fibres may be of a synthetic plastics material such as a polyamide or hydrocarbon polymer such as a polypropylene or polyethylene. Glass fibres may be employed in which case the fibres should preferably be of an alkali resistant glass. Steel fibres may be used but are not preferred.

The amount of fibre may conveniently be from about 0.01 or preferably from 0.02 to 5% based on the weight of the cementitious composition. Amounts in excess of 5% should be avoided because such amounts cause difficulty in spraying the composition.

According to another aspect of the invention a method for the preparation of a settable composition comprises forming a cementitious component (i) comprising at least 25% of calcium aluminate of which at least 40% is calcium monoaluminate, said cementitious component optionally containing one or more particulate fillers but containing less than 10% by weight of calcium sulphate, preferably less than 5%, more preferably being substantially free of calcium sulphate, the % being by weight based on the weight of the cementitious component and mixing said cementitious component (i) with (ii) an aqueous emulsion of an organic polymer, the amount of (ii) in relation to (i) being such as to provide a weight ratio of polymer solids to weight of (i) of from 0.5:1 to 10:1, preferably 0.6:1 to 2.5:1 or with iii) a dispersible organic polymer and where the amount of dispersible polymer is such as to give a weight ratio of polymer to weight of (i) of from 0.5:1 to 10:1, preferably 0.6:1 to 2.5:1.

Coating Method.

According to another aspect of the present invention a method for coating a surface such as a rock surface comprises spraying onto the surface (a) a settable composition comprising the cementitious component (i) and the aqueous emulsion of organic polymer (ii) as defined above or (b) a settable composition comprising the calcium aluminate (i) and the dried polymer (iii) as defined above to which water has been added and continuing the spraying to form a coating on the surface at least 2 mm in thickness and allowing the coating to set.

When the organic polymer emulsion (ii) is used the water may be the water already present in the emulsion (ii) whereby the water of the aqueous emulsion is used to hydrate the cement components. If required or preferred additional water may be added.

When the dried polymer emulsion (iii) is used with the calcium aluminate (i) it is necessary to add the water required to hydrate the cement components.

Whether using the emulsion or the dried polymer emulsion the weight of water is preferably at least 50% by weight of the cementitious composition (i), more preferably at least 70% or 90%. Amounts of water greater than the weight of the cementitious composition (i) may be used for example, up to two, three or even five times.

Preferably the pH is controlled by adjusting the amount of alkali/acid to thereby adjust the setting time. Other cement accelerators or retarders may be added. When it is desired to initiate or increase the rate of setting this can be effected by the addition of an alkali. This addition can conveniently be done at or near the nozzle when the mixture is being sprayed. Addition of a strong alkali can give almost instantaneous setting.

Addition of a gelling agent such as a borate can accelerate the gelling of the polymer. The rate of gelling can be adjusted by selecting a borate of suitable solubility. For example, calcium borate is less soluble than zinc borate and gives a longer gelling and therefore working time.

The advantages of this are that the mixing equipment does not need to be cleaned out periodically e.g. after every 2 to 3 mixes and continuous placers can be used.

The invention also provides a method of treating a rock surface in a mine which comprises spraying onto the surface a cementitious mixture and an organic polymer emulsion to form a film on the surface at least 2 mm in thickness.

The coating may be applied to provide support. It has been found that a coating of about 4 mm (e.g. about 3 to 7 mm) in thickness may be used as a replacement for wire mesh employed to prevent spalling and loose rock fragments from falling in a mine e.g. mesh referred to in the USA as No. 7 welded wire mesh. The coatings may be used in mines which are known as "hard rock mines" such as nickel or gold mines and also in coal mines.

The coatings may be used for example when mining coal by the room and pillar method to reduce the size of the pillars which are left to provide support and thereby recover more coal. This is achieved by spraying the coating onto the pillars thereby increasing their load bearing capability.

The coating may also be used to stabilise the ribs and for the repair and sealing of ventilation control structures. The coatings my also be applied to reduce or prevent weathering, that is the erosion of freshly exposed rock surfaces by air in the mine or for the suppression of radon gas in a uranium mine or for stabilising embankments for example in a quarry, for stabilising roofs of tunnels or the like.

FIGS. 1 and 2 show the apparatus used in mixing and spraying to apply the coatings of the invention.

Referring to FIG. 1 three lines 2, 4 and 6 are connected to chamber 7 adjacent to a spray nozzle 8. Premixed emulsion/cement is supplied by line 2, air is supplied by line 4 where it is mixed with accelerator (if used) from line 6 before contacting the emulsion/cement mixture. A spray 10 comprising cement/emulsion, air and accelerator is emitted from the spray nozzle.

Referring to FIG. 2 dry powder 19 comprising cement and dried polymer emulsion is contained in hopper 20 from which it is withdrawn by a horizontal screw 22 into conduit 24. A controlled amount of water from a meter 25 is introduced into the conduit 24 and mixed with the powder by the action of the screw 22. From the conduit 24 the mixture is fed under gravity to a vessel 26 from which it is withdrawn by a Moyno pump 27 and then to a spray (not shown). The pump 27 is run faster than the mixture is fed to the vessel 26 so that the residence time in the vessel 26 is very short. Such an arrangement is known as a continuous placer.

According to another aspect of the invention the above defined settable composition maybe provided in the form of a two part system, which parts when mixed, provide the above defined settable composition.

The two parts may comprise a first part containing calcium aluminate and polymer emulsion and a second part containing an accelerator for the cement reaction and polymer emulsion.

The first part may contain a retarder for the cement reaction and the second part may contain an accelerator for the cement reaction.

Substantially all the calcium aluminate required to form the above defined settable composition may be provided in the first part and substantially all the polymer emulsion may be contained in the second part.

Each part preferably contains sufficient polymer emulsion to provide mobility.

According to a further aspect of the invention there is provided a coating obtained by spraying an aqueous composition comprising a cementitious component, an organic polymer and fibres as described above onto a substrate said coating having a tensile strength such that a specimen 3 mm in thickness has a tensile strength measured in accordance with ASTM D 412-98 of at least 50 psi at 2 hours.

The invention is described by the following Examples. In all the following Examples the cementitious composition was first prepared by mixing as dry powders, the high alumina cement, anhydrite (if present), lithium carbonate, sodium heptonate, fibres (if present) and fillers (if present).

The thus prepared dry cementitious composition was added at ambient temperature with stirring to the aqueous polymer emulsion contained in a mixing bowl.

The coatings were prepared by pouring the mixture of aqueous polymer emulsion and cementitious component into moulds and allowing to set.

EXAMPLES 1 TO 4

Examples 1 to 3 are not according to the invention and are included for comparative purposes.

A series of settable coating compositions were prepared in which the amount of calcium sulphate was varied and the different compositions were applied as a coating.

The tensile strength was measured at intervals of time starting at 2 hours after formation of the coating.

The flexibility at 6 months was also determined.

The details of the compositions and the results of tensile strength and flexibility measurements are summarised in Table 1.

All parts are by weight.

R.H. means relative humidity.

HAC means high alumina cement.

TABLE 1

|  | Example 1 | Example 2 | Example 3 | Example 4 |
|---|---|---|---|---|
| Component A |  |  |  |  |
| HAC* | 70.36 | 80.27 | 88.40 | 99.40 |
| Anhydrite | 29.31 | 19.13 | 11.00 | 0.00 |
| Lithium carbonate | 0.10 | 0.44 | 0.44 | 0.44 |
| Sodium heptonate | 0.23 | 0.16 | 0.16 | 0.16 |
| Fibre | 0.00 | 0.00 | 0.00 | 0.00 |
| Total | 100.00 | 100.00 | 100.00 | 100.00 |
| Component B |  |  |  |  |
| Polymer emulsion Taevalon 705** | 200 | 200 | 200 | 200 |
| Weight ratio of component B to A | 2:1 | 2:1 | 2:1 | 2:1 |
| Pumping life (mins) | 40 | 40 | 35 | 35 |
| Tensile strength (psi) |  |  |  |  |
| 2 hours | 17 | 59 | 61 | 40 |
| 24 hours | 251 | 231 | 264 | 271 |
| 7 days | 374 | 385 | 387 | 304 |
| 28 days | 396 | 451 | 476 | 461 |
| Flexibility after 6 months at 25° C. and 65% R.H. | None, brittle | Breaks on flexing | Breaks on flexing | Good, no cracking on flexing |

*Secar 71 is an HAC containing >68.5% alumina and having a content of mono calcium aluminate of about 65% by weight.
**Taevalon 705 was obtained from Air Products Korea and was an emulsion in water of an ethylene vinyl acetate copolymer and contains about 54.5% by weight of polymer solids.

It had a glass transition temperature $T_g$ of 0° C. and its viscosity was in the range 1900 to 2800 cps and its pH was in the range 4.0 to 5.0.

The results in Table 1 show that the long term flexibility is improved by reducing the amount of calcium sulphate (anhydrite) in the composition.

The most flexible composition after storage for 6 months was that of Example 4 which contained no calcium sulphate.

EXAMPLES 5 and 6

Examples 5 and 6 are according to the invention. In Examples 5 and 6 different amounts of fibre were included.

The tensile strength of the coatings obtained from the compositions was measured at intervals of time starting at 2 hours after the formation of the coating.

The details of the compositions and the tensile strength measurements are shown in Table 2.

TABLE 2

|  | Example 4 | Example 5 | Example 6 |
|---|---|---|---|
| Component A |  |  |  |
| HAC | 99.4 | 98.1 | 96.8 |
| Anhydrite | 0.00 | 0.00 | 0.00 |
| Lithium carbonate | 0.44 | 0.44 | 0.44 |
| Sodium heptonate | 0.16 | 0.16 | 0.16 |
| Fibre* (+ %) | 0 | 1.3 | 2.6 |
| Total | 100.00 | 100.00 | 100.00 |
| Component B |  |  |  |
| Taevalon | 200.00 | 200.00 | 200.00 |
| Weight ratio of component B to A | 2:1 | 2:1 | 2:1 |
| Pumping life (mins) | 35 | 35 | 30 |
| Tensile strength (psi) |  |  |  |
| 2 hours | 40 | 103 | 139 |
| 4 hours | 95 | 256 | 294 |
| 24 hours | 271 | 341 | 416 |
| 28 days | 461 | 467 | 548 |

*polypropylene fibres 4 mm in length sold under the trade name Fibrin 18. The HAC was the Secar 71 used in Examples 1 to 4.

Measurement of Tensile Strength.

Specimens were cast into 3 mmm deep dumbbell molds in accordance with ASTM D 412-98a.

The specimens were demolded after 2 hours and (in the case of the 2 hour speciment tested immediately) or allowed to cure at 25° C. and 65% R.H until tested. The testing procedure was as follows: the specimens were broken on a Hounsfield Tensometer fitted with a 5000N load cell at a rate of 10 mm/minute. Tensile strength was determined by dividing the maximum load by the cross sectional area at the break. Elongation at break was measured by cross head movement.

Examples 5 and 6 show the effect of including fibres in the formulation.

The tensile strength is significantly increased, particularly the tensile strength at 2 and 4 hours.

The flexibility at 6 months at 25 degrees Centigrade and 65% R.H. of the products of Examples 5 and 6 was essentially the same as that of Example 4.

EXAMPLES 7 TO 12

A series of compositions were prepared in which the amount of fibre was varied and applied as a coating.

The HAC and fibre were the same as those used in Examples 5 and 6.

The tensile strength was measured at intervals of time starting at 2 hours after formation of the coating.

The flexibility at 6 months was also measured.

The details of the compositions and the results of the tensile strength measurements are recorded in Table 3

TABLE 3

|  | Example No | | | | | |
|---|---|---|---|---|---|---|
|  | 7 wt | 8 Wt | 9 wt | 10 wt | 11 wt | 12 wt |
| Component A |  |  |  |  |  |  |
| HAC | 99.41 | 98.91 | 98.41 | 97.41 | 96.41 | 95.41 |
| Lithium carbonate | 0.43 | 0.43 | 0.43 | 0.43 | 0.43 | 0.43 |
| Sodium heptonate | 0.16 | 0.16 | 0.16 | 0.16 | 0.16 | 0.16 |
| Fibre | 0 | 0.5 | 1.0 | 2.0 | 3.0 | 4.0 |
| Total | 100.00 | 100.00 | 100.00 | 100.00 | 100.00 | 100.00 |
| Component B: Taevalon 705 | 150 | 150 | 150 | 150 | 150 | 150 |
| Weight Ratio of component B to A | 1.5:1 | 1.5:1 | 1.5:1 | 1.5:1 | 1.5:1 | 1.5:1 |
| Pumping life (mins) | 20 | 20 | 20 | 15 | 15 | 15 |
| Tensile strength psi |  |  |  |  |  |  |
| 2 hrs | 21 | 22 | 60 | 120 | 150 | 168 |
| 4 hrs | 157 | 160 | 171 | 239 | 256 | 264 |

TABLE 3-continued

|  | Example No | | | | | |
| --- | --- | --- | --- | --- | --- | --- |
|  | 7 wt | 8 Wt | 9 wt | 10 wt | 11 wt | 12 wt |
| 24 hrs | 410 | 395 | 426 | 412 | 436 | 445 |
| 7 days | 578 | 581 | 594 | 631 | 659 | 679 |

The flexibility of the coatings at 6 months was essentially the same as those in Examples 5 and 6.

The results in Table 3 show a surprising effect: incorporating fibres into the compositions results in a much greater percentage increase in tensile strength at 2 and 4 hours than at 24 hours.

EXAMPLE 13

A cementitious composition was prepared from the components listed in the first 6 lines in Table 4 and blended with Taevalon polymer emulsion to give a weight ratio of polymer solids to cementitious composition of 1.5:1.

The tensile strength was determined at intervals of time at 30° C. and at 65% and 100% relative humidity and the results recorded in Table 5.

The fibre and HAC were the same as those used in Examples 5 and 6.

TABLE 4

|  | Amount by weight |
| --- | --- |
| Component A | |
| High alumina cement | 97.13 |
| Anhydrite | 0.00 |
| Lithium carbonate | 0.49 |
| Sodium heptonate | 0.18 |
| Guar gum | 0.25 |
| Fibre | 1.95 |
| Total | 100.00 |
| Component B | |
| Taevalon | 150.00 |
| Weight ratio of component B to A. | 1.5:1 |

TABLE 5

| Pump life (mins) | 45 |
| --- | --- |
| Tensile strength (psi) | RH = 65% |
| 2 hours | 113 |
| 4 hours | 290 |
| 8 hours | 410 |
| 24 hours | 463 |
| 7 days | 623 |

Flexibility.

The flexibility at 6 months was good: there being no cracking on bending round a 18 mm diameter curve.

EXAMPLE 14

A settable composition was prepared in the manner previously described from the ingredients in Table 6.

TABLE 6

|  | Amount by weight |
| --- | --- |
| Component A | |
| High alumina cement | 78.38 |
| Anhydrite | 0.00 |
| Lithium carbonate | 0.32 |
| Sodium heptonate | 0.14 |
| Guar gum | 0.24 |
| Welan gum | 0.12 |
| ggbfs | 20.00 |
| Fibre | 0.8 |
| total | 100.00 |
| Component B | |
| Taevalon 705 | 200.00 |
| Weight ratio of component B to A | 2:1 |

Specimens were tested as described above.

The flexibility of the specimens at 6 months was found to be good.

What is claimed is:

1. A settable composition comprising:
   (i) a cementitious component comprising at least 25% of calcium aluminate of which at least 40% is calcium monoaluminate said cementitious component optionally containing one or more particulate fillers but containing less than 10% by weight of calcium sulphate, the % being by weight being based on the weight of the cementitious component, and
   (ii) an aqueous emulsion of an organic polymer, the amount of (ii) in relation to (i) being such as to provide a weight ratio of polymer solids to weight of (i) of from 0.5:1 to 10:1, or
   (iii) a dispersible organic polymer and where the amount of dispersible polymer is such as to give a weight ratio of polymer to weight of (i) of from 0.5:1 to 10:1.

2. A settable composition as claimed in claim 1 wherein the cementitious component (i) contains an amount of reinforcing fibre effective to improve a tensile strength of coatings obtained from the settable composition but not exceeding 5% by weight of the cementitious component (i).

3. A settable composition as claimed in claim 1 containing water in an amount equal to at least 50% by weight of the weight of the cementitious component (i).

4. A settable composition as claimed in claim 2 wherein the fibre are formed of a synthetic plastics material, glass or steel.

5. A settable composition as claimed in claim 4 wherein the synthetic plastics material is a hydrocarbon polymer or polyamide.

6. A settable composition as claimed in claim 2 wherein the fibre are from 1 to 30 mm in length and from 10 to 40 microns in diameter.

7. A settable composition as claimed in claim 1 wherein the calcium aluminate is provided by a commercial grade of high alumina cement.

8. A settable composition as claimed in claim 1, wherein the settable composition comprises (i) and (ii), and wherein the weight ratio of polymer solids of (ii) to weight of (i) is from 0.6:1 to 2.5:1.

9. A settable composition as claimed in claim 1, wherein the settable composition comprises (i) and (iii), and wherein the weight ratio of polymer of (iii) to weight of (i) is from 0.6:1 to 2.5:1.

10. A settable composition as claimed in claim 3 containing water in an amount from 70% to 250% by weight of the weight of the cementitious component (i).

11. A method of applying a coating to a surface which method comprises forming a settable composition as claimed in claim 1 and spraying the composition onto the surface to form a coating at least 2 mm in thickness.

12. A coating obtained by applying an aqueous composition comprising a a settable composition as claimed in claim 1, an organic polymer and fibres onto a substrate wherein the coating has a tensile strength such that a specimen 3mm in thickness has a tensile strength of at least 50 psi at 2 hours.

13. A coating as claimed in claim 12 wherein the tensile strength is at least 100 psi at 2 hours.

14. A method of preparing a settable composition which method comprises forming a cementitious component (i) comprising at least 25% of calcium aluminate of which at least 40% is calcium monoaluminate said cementitious component optionally containing one or more particulate fillers but containing less than 10% by weight of calcium sulphate, the % being by weight based on the weight of the cementitious component and mixing said cementitious component (i) with (ii) an aqueous emulsion of an organic polymer, the amount of (ii) in relation to (i) being such as to provide a weight ratio of polymer solids to weight of (i) of from 0.5:1 to 10:1 or with (iii) a dispersible organic polymer and where the amount of dispersible polymer is such as to give a weight ratio of polymer to weight of(i) of from 0.5:1 to 10:1.

15. A method as claimed in claim 14 wherein there is added an amount of reinforcing fibre effective to improve a tensile strength of coatings obtained from the settable composition, the amount of fibre not exceeding 5% by weight of the cementitious component (i).

16. A method as claimed in claim 14, comprising mixing (i) and (ii) so as to provide a weight ratio of polymer solids of (ii) to weight of (i) of from 0.6:1 to 2.5:1.

17. A method as claimed in claim 14, comprising mixing (i) and (iii) so as to provide a weight ratio of polymer of (iii) to weight of (i) of from 0.6:1 to 2.5:1.

* * * * *